United States Patent
Hara et al.

(10) Patent No.: US 9,667,171 B2
(45) Date of Patent: May 30, 2017

(54) SWITCHING CIRCUIT, POWER CONVERTER, AND CONTROL METHOD

(71) Applicant: Panasonic Intellectual Property Management Co., Ltd., Osaka (JP)

(72) Inventors: Shoichi Hara, Osaka (JP); Kazuyuki Sakiyama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 53 days.

(21) Appl. No.: 14/723,515

(22) Filed: May 28, 2015

(65) Prior Publication Data

US 2015/0263646 A1    Sep. 17, 2015

Related U.S. Application Data

(63) Continuation of application No. PCT/JP2014/004223, filed on Aug. 19, 2014.

(30) Foreign Application Priority Data

Aug. 26, 2013 (JP) ................................. 2013-174922

(51) Int. Cl.
*H02M 7/538* (2007.01)
*H02M 7/5387* (2007.01)
(Continued)

(52) U.S. Cl.
CPC ........... *H02M 7/5387* (2013.01); *B60L 3/003* (2013.01); *B60L 11/1812* (2013.01);
(Continued)

(58) Field of Classification Search
CPC .. H02M 1/088; H02M 3/335; H02M 3/33507; H02M 7/5387
See application file for complete search history.

(56) References Cited

U.S. PATENT DOCUMENTS

| 8,035,996 B1 * | 10/2011 | Greenfeld | ........... H02M 3/3376 363/132 |
| 8,526,201 B2 * | 9/2013 | Minami | .............. H02M 1/4258 363/127 |

(Continued)

FOREIGN PATENT DOCUMENTS

JP    2012-239341    12/2012

OTHER PUBLICATIONS

International Search Report of PCT application No. PCT/JP2014/004223 dated Oct. 21, 2014.

*Primary Examiner* — Matthew Nguyen
(74) *Attorney, Agent, or Firm* — McDermott Will & Emery LLP

(57) ABSTRACT

A switching circuit according to an aspect of the present disclosure includes: a full-bridge circuit including a first leg that includes a first switch and a second switch, and a second leg that includes a third switch and a fourth switch; and a control circuit operative to (a) output a first control signal group that changes the first leg into a state in which the third switch is off and the fourth switch is on after changing the first leg into a state in which the first switch is on and the second switch is off, and (b) output a second control signal group that changes the second leg into a state in which the third switch is off and the fourth switch is on before changing the first leg into a state in which the first switch is on and the second switch is off.

20 Claims, 11 Drawing Sheets

(51) Int. Cl.
*B60L 3/00* (2006.01)
*B60L 11/18* (2006.01)
*B60L 15/00* (2006.01)
*H02M 1/088* (2006.01)
*H02M 3/335* (2006.01)
*H02M 3/337* (2006.01)
*H02M 1/00* (2006.01)

(52) U.S. Cl.
CPC ....... *B60L 11/1833* (2013.01); *B60L 11/1877* (2013.01); *B60L 15/007* (2013.01); *H02M 1/088* (2013.01); *H02M 3/3376* (2013.01); *H02M 3/33507* (2013.01); *B60L 2210/10* (2013.01); *B60L 2210/30* (2013.01); *B60L 2210/40* (2013.01); *B60L 2240/36* (2013.01); *B60L 2240/525* (2013.01); *H02M 2001/0058* (2013.01); *H02M 2007/53878* (2013.01); *Y02T 10/645* (2013.01); *Y02T 10/7005* (2013.01); *Y02T 10/705* (2013.01); *Y02T 10/7072* (2013.01); *Y02T 10/7216* (2013.01); *Y02T 10/7241* (2013.01); *Y02T 10/92* (2013.01); *Y02T 90/12* (2013.01); *Y02T 90/121* (2013.01); *Y02T 90/125* (2013.01); *Y02T 90/127* (2013.01); *Y02T 90/14* (2013.01)

(56) References Cited

U.S. PATENT DOCUMENTS

| | | | | |
|---|---|---|---|---|
| 2011/0273909 | A1* | 11/2011 | Christopher | H02M 3/3376 363/17 |
| 2011/0299301 | A1* | 12/2011 | Huang | H02M 3/3376 363/17 |
| 2012/0026754 | A1* | 2/2012 | Ye | H02M 3/285 363/17 |
| 2013/0010507 | A1* | 1/2013 | Kitahara | H02H 7/1227 363/56.03 |
| 2013/0223103 | A1* | 8/2013 | Pahlevaninezhad | H02M 3/337 363/17 |

* cited by examiner

SWITCHING CIRCUIT, POWER CONVERTER, AND CONTROL METHOD

BACKGROUND

1. Technical Field

The present disclosure relates to a switching circuit, a power converter, a battery charger, a vehicle, and a control method.

2. Description of the Related Art

Recently, in order to minimize electromagnetic induction noise produced from electronic equipment and reduce switching loss in switches, soft switching technology that causes switches to perform zero-voltage switching (ZVS) or zero-current switching (ZCS) is being researched.

Soft switching technology is also being applied to DC-DC converters to improve performance. The phase-shift technique is one DC-DC converter control technique that applies soft switching (for example, see Japanese Unexamined Patent Application Publication No. 2012-239341).

SUMMARY

In switching circuits of the past, improved reliability of the switches is desired.

One non-limiting and exemplary embodiment provides a switching circuit, a power converter, a battery charger, a vehicle, and a control method able to improve the reliability of switches.

A switching circuit according to an aspect of the present disclosure includes: a full-bridge circuit that includes a first leg, in which a first switch and a second switch are connected in series, and a second leg, in which a third switch and a fourth switch are connected in series, the first leg and the second leg being connected in parallel; and a control circuit operative to (a) output a first control signal group that changes the first leg into a state in which the third switch is off and the fourth switch is on after changing the first leg into a state in which the first switch is on and the second switch is off, and (b) output a second control signal group that changes the second leg into a state in which the third switch is off and the fourth switch is on before changing the first leg into a state in which the first switch is on and the second switch is off.

Note that these comprehensive or specific aspects may also be realized by a power converter, a battery charger, a vehicle, a system, a control circuit, or a control method, and may also be realized by an arbitrary combination of the above.

According to a switching circuit, a power converter, a battery charger, a vehicle, or a control method of the present disclosure, the reliability of switches included in a switching circuit can be improved.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
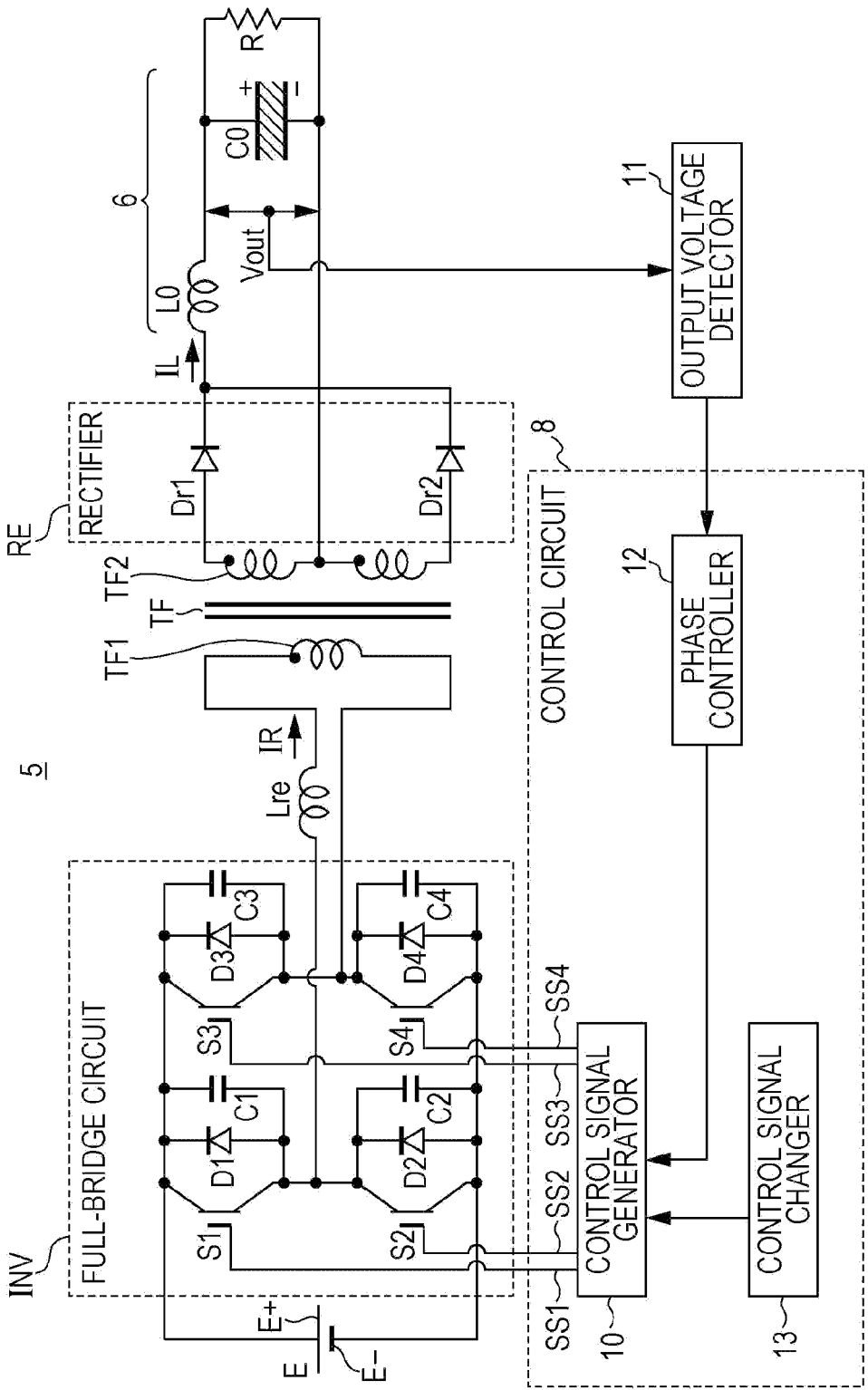
FIG. 1 is a circuit diagram illustrating an exemplary configuration of a DC-DC converter according to Embodiment 1.

Underlying Knowledge Forming Basis of the Present Disclosure

The inventors investigated ways to improve the reliability of the switches constituting a full-bridge circuit in a DC-DC converter, and discovered the following issues.

A full-bridge circuit typically includes four switches connected in a full bridge. The full-bridge circuit is controlled by soft switching, for example. When soft switching control of the phase-shift technique is conducted, a resonance coil is connected on the output side of the full-bridge circuit, and a capacitor is connected to each switch, for example. Soft switching control of the phase-shift technique causes the resonance coil and the capacitors to resonate by switching each switch on and off. As a result, zero-voltage switching (ZVS) is realized.

Soft switching is realized by suitably configuring the inductance of the resonance coil, the capacitance of the capacitors, and the times at which to switch each switch on and off. The resonant energy varies according to the magnitude of the output power. Typically, the inductance of the resonance coil and the capacitance of the capacitors are configured so that the resonant energy reaches maximum when the output voltage reaches maximum.

However, with such a configuration, the resonant energy decreases if the output voltage decreases, making soft switching control difficult in some cases. For example, a switch that is turned on immediately after energy is accumulated in the resonance coil may be switched by soft switching. However, a switch that is turned on immediately after energy in the resonance coil is discharged may be unable to be switched by soft switching in some cases. As a result, with the conventional phase-shift technique, an imbalance of current stress may occur between the switches that constitute the leg on which soft switching is conducted, and the switches that constitute the leg on which soft switching is not conducted. An imbalance of current stress may lead to inconsistencies in the amount of generated heat among the switches. Since cooling mechanisms such as heat sinks are designed on the basis of the maximum amount of generated heat, inconsistencies in the amount of generated heat may lead to an increase in the size of the cooling mechanism overall. In addition, an imbalance of current stress among switches may also lead to inconsistencies in the reliability or the lifespan of the switches.

Based on the above findings, the inventors discovered a method to equalize the current flowing through each switch, which led to the present disclosure. Note that the above description is for the purpose of aiding comprehension of the present disclosure, and does not limit the embodiments described hereinafter.

Overview Of Embodiments

A switching circuit according to an aspect of the present disclosure includes: a full-bridge circuit including a first leg that includes a first switch and a second switch, and a second leg, connected in parallel with the first leg, that includes a third switch and a fourth switch; and a control circuit that outputs a first control signal group causing a change to a state in which the third switch is off and the fourth switch is on after causing a change to a state in which the first switch is on and the second switch is off, and a second control signal group causing a change to a state in which the third switch is off and the fourth switch is on before causing a change to a state in which the first switch is on and the second switch is off.

Since each switch is controlled by the first control signal group and the second control signal group, imbalances in the current stress imposed on each switch can be cancelled out, and the current stress can be equalized. For this reason, inconsistencies in heat generation or element properties caused by current stress imbalances can be reduced, for example, and the reliability of the switching circuit can improve.

In a switching circuit according to an aspect of the present disclosure, for example, the first control signal group may cause a change to a state in which the third switch is on and the fourth switch is off after causing a change to a state in which the first switch is off and the second switch is on, and the second control signal group may cause a change to a state in which the third switch is on and the fourth switch is off before causing a change to a state in which the first switch is off and the second switch is on.

In a switching circuit according to an aspect of the present disclosure, for example, provided that, a first mode is a state in which the first switch and the third switch are on while the second switch and the fourth switch are off, a second mode is a state in which the first switch and the fourth switch are on while the second switch and the third switch are off, a third mode is a state in which the second switch and the fourth switch are on while the first switch and the third switch are off, and a fourth mode is a state in which the second switch and the third switch are on while the first switch and the fourth switch are off, the first control signal group may turn the first switch, the second switch, the third switch, and the fourth switch on and off on a first cycle that transitions in an order of the first mode, the second mode, the third mode, and the fourth mode, and the second control signal group may turn the first switch, the second switch, the third switch, and the fourth switch on and off on a second cycle that transitions in an order of the third mode, the second mode, the first mode, and the fourth mode.

In a switching circuit according to an aspect of the present disclosure, for example, provided that a first mode is a state in which the first switch and the third switch are on while the second switch and the fourth switch are off, a second mode is a state in which the first switch and the fourth switch are on while the second switch and the third switch are off, a third mode is a state in which the second switch and the fourth switch are on while the first switch and the third switch are off, and a fourth mode is a state in which the second switch and the third switch are on while the first switch and the fourth switch are off, the first control signal group may turn the first switch, the second switch, the third switch, and the fourth switch on and off on a first cycle that transitions in an order of the third mode, the fourth mode, the first mode, and the second mode, and the second control signal group may turn the first switch, the second switch, the third switch, and the fourth switch on and off on a second cycle that transitions in an order of the first mode, the fourth mode, the third mode, and the second mode.

Since each switch is turned on and off on a first cycle and a second cycle, imbalances in the current stress imposed on each switch can be cancelled out, and the current stress can be equalized. For this reason, the reliability of each switch can improve.

In a switching circuit according to an aspect of the present disclosure, for example, the control circuit, after causing the first cycle to repeat N times (where N is an integer of 1 or more), may cause the second cycle to repeat M times (where M is an integer of 1 or more).

In a switching circuit according to an aspect of the present disclosure, for example, the control circuit may cause the first cycle and the second cycle to repeat alternately.

In a switching circuit according to an aspect of the present disclosure, for example, a conducting terminal from among a pair of conducting terminals of the first switch that is not connected to the second switch may be connected to a conducting terminal from among a pair of conducting terminals of the third switch that is not connected to the fourth switch, and a conducting terminal from among a pair of conducting terminals of the second switch that is not connected to the first switch may be connected to a conducting terminal from among a pair of conducting terminals of the fourth switch that is not connected to the third switch.

A switching circuit according to an aspect of the present disclosure may be, for example, a switching circuit connected to a resonance coil, and the resonance coil may be connected between a connection point between the first switch and the second switch, and a connection point between the third switch and the fourth switch.

Consequently, the resonance phenomenon of the resonance coil is used to enable soft switching control. As a result, switching loss can be reduced.

In a switching circuit according to an aspect of the present disclosure, for example, the full-bridge circuit may include a first capacitor connected in parallel with the first switch, a second capacitor connected in parallel with the second switch, a third capacitor connected in parallel with the third switch, and a fourth capacitor connected in parallel with the fourth switch.

In a switching circuit according to an aspect of the present disclosure, for example, provided that a first dead time mode is a state in which the first switch and the second switch are off, and a second dead time mode is a state in which the third switch and the fourth switch are off, the first cycle may include the first dead time mode and the second dead time mode, the second cycle may include the first dead time mode and the second dead time mode, during the first dead time mode, one of the first capacitor and the second capacitor may be charged while the other is discharged, according to energy accumulated in the resonance coil, and during the second dead time mode, one of the third capacitor and the fourth capacitor may be charged while the other is discharged, according to energy accumulated in the resonance coil.

Consequently, the resonance phenomenon between the resonance coil and the capacitors is used to enable zero-voltage switching. As a result, switching loss can be reduced.

In a switching circuit according to an aspect of the present disclosure, for example, the control circuit may include a control signal selector that selects whether to change from the first control signal group to the second control signal group, or to change from the second control signal group to the first control signal group, a phase controller that, according to an output information signal that is externally input, decides a magnitude of an advanced phase or a magnitude of a retarded phase of a time to change the first switch to on with respect to a time to change the fourth switch to on, and a control signal generator that generates the first control signal group or the second control signal group according to a selection by the control signal selector and a decision by the phase controller.

In a switching circuit according to an aspect of the present disclosure, for example, the control signal selector may select a change without referencing the output information signal.

Consequently, the control signal selector is able to execute changing control between the first control signal group and the second control signal group independently from the control of the phase difference by the phase controller.

A power converter according to an aspect of the present disclosure includes any one of the above switching circuits, a first rectifier that rectifies an AC voltage output from the switching circuit, and a smoothing circuit that smooths an output voltage of the first rectifier.

A power converter according to another mode of the present disclosure includes any one of the above switching circuits, a first rectifier that rectifies an AC voltage output from the switching circuit, a smoothing circuit that smooths an output voltage of the first rectifier, and an output voltage detector that detects an output voltage of the first rectifier or an output voltage of the smoothing circuit, and outputs the output information signal to the phase controller.

Since each switch is controlled by the first control signal group and the second control signal group, imbalances in the current stress imposed on each switch can be cancelled out, and the current stress can be equalized. For this reason, inconsistencies in heat generation or element properties caused by current stress imbalances can be reduced, for example, and the reliability of the power converter can improve.

A battery charger according to an aspect of the present disclosure includes a second rectifier that rectifies an AC voltage from an AC power source, a power factor correction circuit that corrects a power factor of an output power of the second rectifier, and a power converter that converts output power of the power factor correction circuit into DC power used to charge a battery.

A vehicle according to an aspect of the present disclosure includes a battery and a power converter that outputs DC power used to charge the battery.

Since each switch is controlled by the first control signal group and the second control signal group, imbalances in the current stress imposed on each switch can be cancelled out, and the current stress can be equalized. For this reason, inconsistencies in heat generation or element properties caused by current stress imbalances can be reduced, for example, and the reliability of the battery charger can improve.

A control circuit according to an aspect of the present disclosure is a control circuit in a switching circuit provided with a full-bridge circuit including a first leg that includes a first switch and a second switch, and a second leg, connected in parallel with the first leg, that includes a third switch and a fourth switch, and the control circuit that outputs a control signal to turn the first switch, the second switch, the third switch, and the fourth switch on and off, wherein the control circuit outputs a first control signal group causing a change to a state in which the third switch is off and the fourth switch is on after causing a change to a state in which the first switch is on and the second switch is off, and a second control signal group causing a change to a state in which the third switch is off and the fourth switch is on before causing a change to a state in which the first switch is on and the second switch is off.

In a control circuit according to an aspect of the present disclosure, for example, the first control signal group may cause a change to a state in which the third switch is on and the fourth switch is off after causing a change to a state in which the first switch is off and the second switch is on, and the second control signal group may cause a change to a state in which the third switch is on and the fourth switch is off before causing a change to a state in which the first switch is off and the second switch is on.

Since each switch is controlled by the first control signal group and the second control signal group, imbalances in the current stress imposed on each switch can be cancelled out, and the current stress can be equalized. For this reason, a control circuit of the present disclosure can reduce inconsistencies in heat generation or element properties caused by current stress imbalances, for example, and can improve the reliability of the full-bridge circuit.

A control method according to an aspect of the present disclosure is a control method that controls a full-bridge circuit including a first leg that includes a first switch and a second switch, and a second leg, connected in parallel with the first leg, that includes a third switch and a fourth switch, the control method selectively executing a first control that turns the first switch, the second switch, the third switch, and the fourth switch on and off on a first cycle, or a second control that turns the first switch, the second switch, the third switch, and the fourth switch on and off on a second cycle different from the first cycle. In the first control, a change is caused to a state in which the third switch is off and the fourth switch is on after causing a change to a state in which the first switch is on and the second switch is off, and in the second control, a change is caused to a state in which the third switch is off and the fourth switch is on before causing a change to a state in which the first switch is on and the second switch is off.

In a control method according to an aspect of the present disclosure, for example, in the first control, a change may be caused to a state in which the third switch is on and the fourth switch is off after causing a change to a state in which the first switch is off and the second switch is on, and in the second control, a change may be caused to a state in which the third switch is on and the fourth switch is off before causing a change to a state in which the first switch is off and the second switch is on.

Since each switch is controlled by the first control and the second control, imbalances in the current stress imposed on each switch can be cancelled out, and the current stress can be equalized. For this reason, a control method of the present disclosure can reduce inconsistencies in heat generation or element properties caused by current stress imbalances, for example, and can improve the reliability of the full-bridge circuit.

Embodiment 1
[Circuit Configuration]

FIG. 1 is a circuit diagram illustrating an exemplary configuration of a DC-DC converter 5 according to Embodiment 1.

The DC-DC converter 5 in FIG. 1 is a power converter, converting an input DC voltage into a different DC voltage to output the converted DC voltage. The DC-DC converter 5 includes a full-bridge circuit INV, a resonance coil Lre, a high-frequency transformer TF, a rectifier RE, a smoothing filter 6, an output voltage detector 11, and a control circuit 8. The full-bridge circuit INV and the control circuit 8 constituting a switching circuit.

The full-bridge circuit INV includes a first switch S1, a second switch S2, a third switch S3, and a fourth switch S4 connected in a full bridge. A first leg includes the first switch S1 as a first upper arm and the second switch S2 as a first lower arm. A second leg includes the third switch S3 as a second upper arm and the fourth switch S4 as a second lower arm. The first leg and the second leg are connected in parallel. In other words, a first conducting terminal of the first switch is connected to a first conducting terminal of the third switch, a second conducting terminal of the first switch is connected to a first conducting terminal of the second switch, a second conducting terminal of the third switch is connected to a first conducting terminal of the fourth switch, and a second conducting terminal of the second switch is connected to a second conducting terminal of the third switch. The first switch S1 to the fourth switch S4 are semiconductor switches such as MOSFETs or IGBTs, for example. If the switch is a MOSFET, one of the first and second conducting terminals may be the source terminal and the other may be the drain terminal. If the switch is an IGBT, one of the first and second conducting terminals may be the emitter terminal and the other may be the collector terminal.

A first reverse-conducting diode D1 and a first capacitor C1 are connected in parallel to the first switch S1. Similarly, a second reverse-conducting diode D2 to a fourth reverse-conducting diode D4 and a second capacitor C2 to a fourth capacitor C4 are connected in parallel to the second switch S2 to the fourth switch S4, respectively. The first capacitor C1 to the fourth capacitor C4 are snubber capacitors.

From the output part of the first leg to the output part of the second leg of the full-bridge circuit INV, the resonance coil Lre and the primary winding TF1 of the high-frequency transformer TF are connected in series. In other words, the resonance coil Lre is connected between the output part of the first leg of the full-bridge circuit INV and one end of the primary winding TF1 of the high-frequency transformer TF. The output part of the first leg is the connection point between the first switch S1 and the second switch S2, for example. The output part of the second leg is the connection point between the third switch S3 and the fourth switch S4, for example. Note that the resonance coil Lre may be a parasitic capacitance or a capacitive element, for example. The high-frequency transformer TF is provided with a primary winding TF1 and a secondary winding TF2. The high-frequency transformer TF is a type of voltage transformer. In FIG. 1, the start of the windings of the primary winding TF1 and the secondary winding TF2 of the high-frequency transformer TF is indicated with a black dot.

The full-bridge circuit INV converts a DC voltage supplied from a DC voltage source E into a periodically varying AC voltage according to a phase-shift technique. The full-bridge circuit INV outputs the converted AC voltage to the primary winding TF1 of the high-frequency transformer TF via the resonance coil Lre.

The rectifier RE is a type of AC-DC converter circuit. The rectifier RE includes a first rectifying diode Dr1 and a second rectifying diode Dr2, for example. The rectifier RE is connected between the secondary winding TF2 of the high-frequency transformer TF and the smoothing filter 6. The start of the secondary winding TF2 of the high-frequency transformer TF is connected to the anode of the first rectifying diode Dr1, while the end of the secondary winding TF2 is connected to the anode of the second rectifying diode Dr2. The respective cathodes of the first rectifying diode Dr1 and the second rectifying diode Dr2 are commonly connected to one end of an output reactor L0 included in the smoothing filter 6.

The smoothing filter 6 includes an output reactor L0 and an output capacitor C0, for example. The other end of the output reactor L0 is connected to the positive terminal of the output capacitor C0 and one end of a resistive load R. The negative terminal of the output capacitor C0 and the other end of the resistive load R are connected to a center tap of the high-frequency transformer TF.

The rectifier RE performs full-wave rectification of an AC voltage input from the secondary winding TF2 into a DC voltage, which is output to the resistive load R via the smoothing filter 6. The smoothing filter 6 smooths the output voltage from the rectifier RE.

The output voltage detector 11 detects the output voltage Vout across both ends of the resistive load R connected in parallel to the output capacitor C0, and outputs to the control circuit 8.

The control circuit 8 includes a phase controller 12, a control signal selector 13, and a control signal generator 10.

The phase controller 12 controls the switching phase of the DC-DC converter 5 on the basis of the output voltage Vout detected by the output voltage detector 11. The phase controller 12 compares the output voltage Vout fed back from the output voltage detector 11 to a predetermined target voltage Vth. When the output voltage Vout is less than the target voltage Vth, the phase controller 12 applies control to decrease the phase difference θ between the first leg including the first switch S1 and the second switch S2, and the second leg including the third switch S3 and the fourth switch S4. In this case, the current IR flowing through the resonance coil Lre increases compared to before the control. On the other hand, when the output voltage Vout is greater than the target voltage Vth, the phase controller 12 applies control to increase the phase difference θ between the first leg and the second leg. In this case, the current IR flowing through the resonance coil Lre decreases compared to before the control. In other words, the phase controller 12 controls the phase difference θ between the first leg and the second leg to keep the output voltage Vout at the target voltage Vth. Note that, as discussed later, the phase difference θ is positive in some cases, and negative in some cases. In other words, the phase controller 12 decides the magnitude of the advanced phase or the magnitude of the retarded phase according to information about the output voltage Vout input from the output voltage detector 11.

The control signal selector 13 selects whether to cause the control signal generator 10 to output a first control signal group or output a second control signal group. In other words, the control signal selector 13 instructs the control signal generator 10 to change from the first control signal group to the second control signal group, or to change from the second control signal group to the first control signal group. The first control signal group and the second control signal group differ in the order in which to turn on and off the first switch S1, the second switch S2, the third switch S3, and the fourth switch S4. In other words, the first control signal group is a signal group that turns each switch on and off on a first cycle, whereas the second control signal group is a signal group that turns each switch on and off on a second cycle that differs from the first cycle. Details will be discussed later.

The control signal selector 13 executes the control of changing between the first cycle and the second cycle independently from the control of the phase difference by the phase controller 12, for example. In other words, the control signal selector 13 autonomously selects a change without referencing an output information signal. An output information signal may not only be the output voltage Vout, but also the output current IL, the current IR flowing through the resonance coil Lre, or a temperature, for example.

The control signal generator 10 generates the first control signal group and the second control signal group according to the decision by the phase controller 12 and the selection by the control signal selector 13. The control signal generator 10 outputs a control signal SS1, a control signal SS2, a control signal SS3, and a control signal SS4 to the first switch S1, the second switch S2, the third switch S3, and the fourth switch S4 in the full-bridge circuit INV, respectively. A control signal group includes the control signal SS1, the control signal SS2, the control signal SS3, and the control signal SS4. In the present disclosure, among a control signal group, the part that turns each switch on and off on the first cycle is called the first control signal group, while the part that turns each switch on and off on the second cycle is called the second control signal group. In other words, the control signal group is an arrangement of the first control signal group and the second control signal group in a predetermined order. The control signal generator 10 includes a digital computer such as a microcontroller, for example.

[Control Signals]

Figure 2:
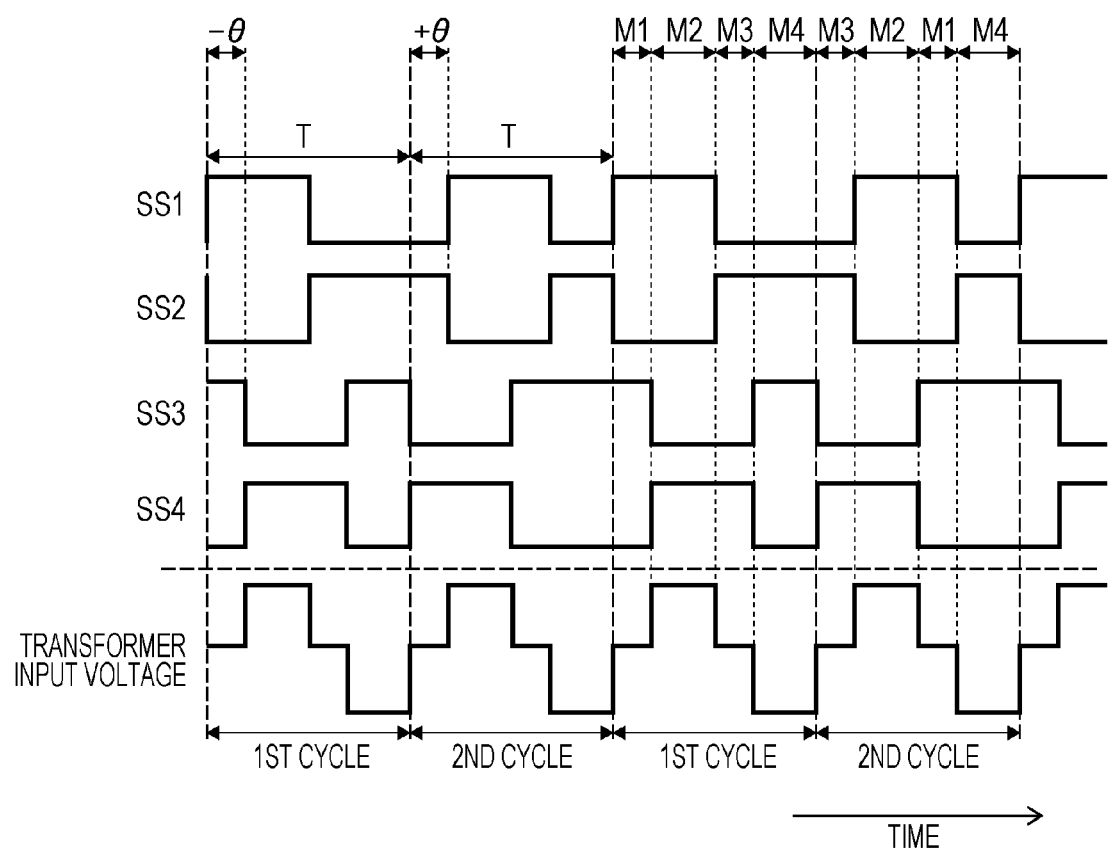
FIG. 2 is a timing chart illustrating an example of operation of a DC-DC converter.

FIG. 2 is a timing chart illustrating an example of the operation of the DC-DC converter 5 in FIG. 1.

The upper part of FIG. 2 illustrates the control signal SS1 input into the first switch S1, the control signal SS2 input into the second switch S2, the control signal SS3 input into the third switch S3, and the control signal SS4 input into the fourth switch S4. The control signals SS1 to SS4 are square waves having a fixed period T. The control signals SS1 to SS4 each take the two values of a high level for turning on a switch, and a low level for turning off a switch.

As illustrated in FIG. 2, the control signal SS1 and the control signal SS2 are complementary. In other words, when the control signal SS1 is at high level, the control signal SS2 is at low level, and when the control signal SS2 is at high level, the control signal SS1 is at low level. Similarly, the control signal SS3 and the control signal SS4 are complementary. In other words, when the control signal SS3 is at high level, the control signal SS4 is at low level, and when the control signal SS4 is at high level, the control signal SS3 is at low level. Note that, although omitted for the sake of simplicity, a dead time during which the control signal SS1 and the control signal SS2 are both at low level is provided between the time at which the control signal SS1 switches and the time at which the control signal SS2 switches. Similarly, a dead time during which the control signal SS3 and the control signal SS4 are both at low level is provided between the time at which the control signal SS3 switches and the time at which the control signal SS4 switches.

In the example illustrated in FIG. 2, the control signal selector 13 causes the control signal generator 10 to generate the control signal SS1 to the control signal SS4 that alternately repeat the first cycle and the second cycle. The first cycle and the second cycle both have a period T. However, as discussed later, the first cycle and the second cycle may be affected by noise, for example, and have different periods. In the first cycle and the second cycle, each of the plurality of switches constituting the full-bridge circuit INV is turned off one time, and turned on one time, for example.

As illustrated in FIG. 2, the control signals SS1 to SS4 includes the following four modes M1 to M4.

(1) In the first mode M1, the first switch S1 and the third switch S3 are on, while the second switch S2 and the fourth switch S4 are off.

(2) In the second mode M2, the first switch S1 and the fourth switch S4 are on, while the second switch S2 and the third switch S3 are off.

(3) In the third mode M3, the second switch S2 and the fourth switch S4 are on, while the first switch S1 and the third switch S3 are off.

(4) In the fourth mode M4, the second switch S2 and the third switch S3 are on, while the first switch S1 and the fourth switch S4 are off.

In the first cycle, the phase of the second leg in the state where the third switch S3 is off and the fourth switch S4 is on becomes retarded compared to the phase of the first leg in the state where the first switch S1 is on and the second switch S2 is off. FIG. 2 illustrates this retarded phase as a first phase difference (−θ). In the first cycle, the first switch S1 is turned on while the third switch S3 is in the on state. In the example illustrated in FIG. 2, the first phase difference (−θ) corresponds to the period of mode M1 in the first cycle.

Meanwhile, in the second cycle, the phase of the second leg in the state where the third switch S3 is off and the fourth switch S4 is on becomes advanced compared to the phase of the first leg in the state where the first switch S2 is on and the second switch S2 is off. FIG. 2 illustrates this advanced phase as a second phase difference (+θ). In the second cycle, the first switch S1 is turned on while the third switch S3 is in the off state. In the example illustrated in FIG. 2, the second phase difference (+θ) corresponds to the period of mode M3 in the second cycle.

The first phase difference (−θ) and the second phase difference (+θ) may have the same absolute value with different signs. The control signal generator 10 generates the second phase difference (+θ) by shifting at least one of the phase of the first leg and the phase of the second leg.

The lower part of FIG. 2 illustrates the voltage that is output from the full-bridge circuit INV and input into the primary winding TF1 of the high-frequency transformer TF. As illustrated in FIG. 2, the waveform of the AC voltage generated by the full-bridge circuit INV is approximately the same between the first cycle and the second cycle.

Figure 3:
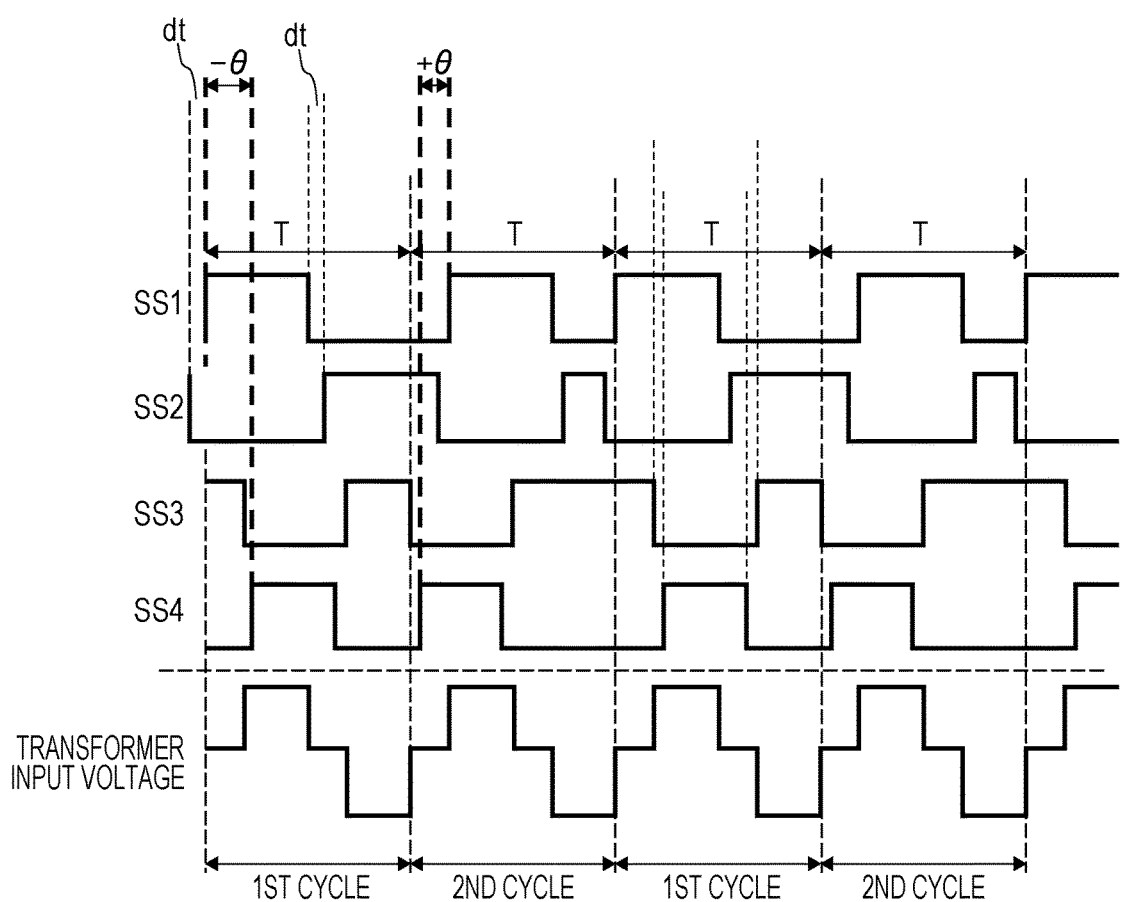
FIG. 3 is a timing chart illustrating an example of operation of a DC-DC converter.

FIG. 3 adds a dead time dt to the timing chart illustrated in FIG. 2. Typically, the two switches that constitute each leg are switched by complementary control signals. For this reason, when the first switch S1 changes from off to on and the second switch S2 changes from on to off, for example, in some cases there occurs a state in which both are momentarily on at the same time. In this case, a shoot-through current flows through the first switch S1 and the second switch S2, producing wasteful power consumption. This is also similar for the third switch S3 and the fourth switch S4. Accordingly, the dead time dt is provided so that the two switches constituting an leg do not turn on at the same time.

When the dead time dt is provided, the beginning of each mode occurs after the previous dead time ends, or in other words, at the time when one of the switches turns on. When the dead time dt is provided, the end of each mode occurs before the next dead time starts, or in other words, at the time when one of the switches turns off.

The operation in the first cycle and when turning on and off each switch of the full-bridge circuit INV will be described with reference to FIGS. 1 and 3. Note that in the following describes an example in which the full-bridge circuit INV is controlled by soft switching. However, a control method of the present disclosure is also applicable to the case of not conducting soft switching control, and the case in which soft switching control is not realized for one part. Such cases may be described by treating the following description as one in which the accumulation and discharge of energy by the resonance coil Lre as well as the charging and discharging of each capacitor C1 to C4 do not occur. In addition, the case of not providing the dead time dt is also similar.

<Operation of First Cycle>

The first cycle starts from the first mode M1 after the fourth mode M4.

The first mode M1 starts as a result of the first switch S1 turning on. If the voltage applied to the first switch S1 is approximately 0 V immediately before switching, ZVS is realized. In the first mode M1, the first switch S1 and the third switch S3 are on, while the second switch S2 and the fourth switch S4 are off. At this point, the energy accumulated in the resonance coil Lre causes a current to flow along a path extending from the resonance coil Lre, through the first switch S1, the third switch S3, and the primary winding TF1, to the resonance coil Lre. After that, the first mode M1 ends as a result of the third switch S3 turning off.

In the dead time after the first mode M1, the energy accumulated in the resonance coil Lre causes a current to flow along a path extending from the resonance coil Lre, through the first switch S1, the DC voltage source E, the fourth capacitor C4, and the primary winding TF1, to the resonance coil Lre, and the fourth capacitor C4 is discharged. In addition, the energy accumulated in the resonance coil Lre causes a current to flow along a path extending from the resonance coil Lre, through the first switch S1, the third capacitor C3, and the primary winding TF1, to the resonance coil Lre, and the third capacitor C3 is charged. After the fourth capacitor C4 finishes discharging and the third capacitor C3 finishes charging, the energy accumulated in the resonance coil Lre causes a current to flow along a path extending from the resonance coil Lre, through the first switch S1, the DC voltage source E, the fourth reverse-conducting diode D4, and the primary winding TF1, to the resonance coil Lre. As a result of electrically connecting the fourth reverse-conducting diode D4, the voltage applied to the fourth switch S4 is approximately 0 V.

The second mode M2 starts as a result of the fourth switch S4 turning on. If the voltage applied to the fourth switch S4 is approximately 0 V immediately before switching, ZVS is realized. In the second mode M2, the first switch S1 and the fourth switch S4 are on, while the second switch S2 and the third switch S3 are off. At this point, the energy accumulated in the resonance coil Lre causes a current to flow along a path extending from the resonance coil Lre, through the first switch S1, the DC voltage source E, the fourth switch S4, and the primary winding TF1, to the resonance coil Lre. After the discharge of energy accumulated in the resonance coil Lre finishes, the DC voltage source E causes a current to flow along a path extending from the DC voltage source E, through the first switch S1, the resonance coil Lre, the primary winding TF1, and the fourth switch S4, to the DC voltage source E, and energy is accumulated in the resonance coil Lre. After that, the second mode M2 ends as a result of the first switch S1 turning off.

In the dead time after the second mode M2, the energy accumulated in the resonance coil Lre causes a current to flow along a path extending from the resonance coil Lre, through the primary winding TF1, the fourth switch S4, and the second capacitor C2, to the resonance coil Lre, and the second capacitor C2 is discharged. In addition, the energy accumulated in the resonance coil Lre causes a current to flow along a path extending from the resonance coil Lre, through the primary winding TF1, the fourth switch S4, the DC voltage source E, and the first capacitor C1, to the resonance coil Lre, and the first capacitor C1 is charged. After the second capacitor C2 finishes discharging and the first capacitor C1 finishes charging, the energy accumulated in the resonance coil Lre causes a current to flow along a path extending from the resonance coil Lre, through the primary winding TF1, the fourth switch S4, and the second reverse-conducting diode D2, to the resonance coil Lre. As a result of electrically connecting the second reverse-conducting diode D2, the voltage applied to the second switch S2 is approximately 0 V.

The third mode M3 starts as a result of the second switch S2 turning on. If the voltage applied to the second switch S2 is approximately 0 V immediately before switching, ZVS is realized. In the third mode M3, the second switch S2 and the fourth switch S4 are on, while the first switch S1 and the third switch S3 are off. At this point, the energy accumulated in the resonance coil Lre causes a current to flow along a path extending from the resonance coil Lre, through the primary winding TF1, the fourth switch S4, and the second switch S2, to the resonance coil Lre. After that, the third mode M3 ends as a result of the fourth switch S4 turning off.

In the dead time after the third mode M3, the energy accumulated in the resonance coil Lre causes a current to flow along a path extending from the resonance coil Lre, through the primary winding TF1, the third capacitor C3, the DC voltage source E, and the second switch S2, to the resonance coil Lre, and the third capacitor C3 is discharged. Also, the energy accumulated in the resonance coil Lre causes a current to flow along a path extending from the resonance coil Lre, through the primary winding TF1, the fourth capacitor C4, and the second switch S2, to the resonance coil Lre, and the fourth capacitor C4 is charged. After the third capacitor C3 finishes discharging and the fourth capacitor C4 finishes charging, the energy accumulated in the resonance coil Lre causes a current to flow along a path extending from the resonance coil Lre, through the primary winding TF1, the third reverse-conducting diode D3, the DC voltage source E, and the second switch S2, to the resonance coil Lre. As a result of electrically connecting the third reverse-conducting diode D3, the voltage applied to the third switch S3 is approximately 0 V.

The fourth mode M4 starts as a result of the third switch S3 turning on. If the voltage applied to the third switch S3 is approximately 0 V immediately before switching, ZVS is realized. In the fourth mode M4, the second switch S2 and the third switch S3 are on, while the first switch S1 and the fourth switch S4 are off. At this point, the energy accumulated in the resonance coil Lre causes a current to flow along a path extending from the resonance coil Lre, through the primary winding TF1, the third switch S3, the DC voltage source E, and the second switch S2, to the resonance coil Lre. After the discharge of energy accumulated in the resonance coil Lre finishes, the DC voltage source E causes a current to flow along a path extending from the DC voltage source E, through the third switch S3, the primary winding TF1, the resonance coil Lre, and the second switch S2, to the DC voltage source E, and energy is accumulated in the resonance coil Lre. After that, the fourth mode M4 ends as a result of the third switch S3 turning off.

In the dead time after the fourth mode M4, the energy accumulated in the resonance coil Lre causes a current to flow along a path extending from the resonance coil Lre, through the second switch S2, the fourth capacitor C4, and the primary winding TF1, to the resonance coil Lre, and the fourth capacitor C4 is discharged. In addition, the energy accumulated in the resonance coil Lre causes a current to flow along a path extending from the resonance coil Lre, through the second switch S2, the DC voltage source E, the third capacitor C3, and the primary winding TF1, to the resonance coil Lre, and the third capacitor C3 is charged. After the fourth capacitor C4 finishes discharging and the third capacitor C3 finishes charging, the energy accumulated in the resonance coil Lre causes a current to flow along a path extending from the resonance coil Lre, through the second switch S2, the fourth reverse-conducting diode D4, and the primary winding TF1, to the resonance coil Lre. As a result of electrically connecting the fourth reverse-conducting diode D4, the voltage applied to the fourth switch S4 is approximately 0 V.

<Operation of Second Cycle>

The second cycle starts from the third mode M3 after the fourth mode M4.

The third mode M3 starts as a result of the fourth switch S4 turning on. If the voltage applied to the fourth switch S4 is approximately 0 V immediately before switching, ZVS is realized. In the third mode M3, the second switch S2 and the fourth switch S4 are on, while the first switch S1 and the third switch S3 are off. At this point, the energy accumulated in the resonance coil Lre causes a current to flow along a path extending from the resonance coil Lre, through the second switch S2, the fourth switch S4, and the primary winding TF1, to the resonance coil Lre. After that, the third mode M3 ends as a result of the second switch S2 turning off.

In the dead time after the third mode M3, the energy accumulated in the resonance coil Lre causes a current to flow along a path extending from the resonance coil Lre, through the first capacitor C1, the DC voltage supply E, the fourth switch S4, and the primary winding TF1, to the resonance coil Lre, and the first capacitor C1 is discharged. In addition, the energy accumulated in the resonance coil Lre causes a current to flow along a path extending from the resonance coil Lre, through the second capacitor C2, the fourth switch S4, and the primary winding TF1, to the resonance coil Lre, and the second capacitor C2 is charged. After the first capacitor C1 finishes discharging and the second capacitor C2 finishes charging, the energy accumulated in the resonance coil Lre causes a current to flow along a path extending from the resonance coil Lre, through the first reverse-conducting diode D1, the DC voltage source E, the fourth switch S4, and the primary winding TF1, to the resonance coil Lre. As a result of electrically connecting the first reverse-conducting diode D1, the voltage applied to the first switch S1 is approximately 0 V.

The second mode M2 starts as a result of the first switch S1 turning on. If the voltage applied to the first switch S1 is approximately 0 V immediately before switching, ZVS is realized. In the second mode M2, the first switch S1 and the fourth switch S4 are on, while the second switch S2 and the third switch S3 are off. At this point, the energy accumulated in the resonance coil Lre causes a current to flow along a path extending from the resonance coil Lre, through the first switch S1, the DC voltage source E, the fourth switch S4, and the primary winding TF1, to the resonance coil Lre. After the discharge of energy accumulated in the resonance coil Lre finishes, the DC voltage source E causes a current to flow along a path extending from the DC voltage source E, through the first switch S1, the resonance coil Lre, the primary winding TF1, and the fourth switch S4, to the DC voltage source E, and energy is accumulated in the resonance coil Lre. After that, the second mode M2 ends as a result of the fourth switch S4 turning off.

The first mode M1 starts as a result of the third switch S3 turning on. In the first mode M1, the first switch S1 and the third switch S3 are on, while the second switch S2 and the fourth switch S4 are off. At this point, the energy accumulated in the resonance coil Lre causes a current to flow along a path extending from the resonance coil Lre, through the primary winding TF1, the third switch S3, and the first switch S1, to the resonance coil Lre. After that, the first mode M1 ends as a result of the first switch S1 turning off.

In the dead time after the first mode M1, the energy accumulated in the resonance coil Lre causes a current to flow along a path extending from the resonance coil Lre, through the primary winding TF1, the third switch S3, the DC voltage source E, and the second capacitor C2, to the resonance coil Lre, and the second capacitor C2 is discharged. In addition, the energy accumulated in the resonance coil Lre causes a current to flow along a path extending from the resonance coil Lre, through the primary winding TF1, the third switch S3, and the first capacitor C1, to the resonance coil Lre, and the first capacitor C1 is charged. After the second capacitor C2 finishes discharging and the first capacitor C1 finishes charging, the energy accumulated in the resonance coil Lre causes a current to flow along a path extending from the resonance coil Lre, through the primary winding TF1, the third switch S3, the DC voltage source E, and the second reverse-conducting diode D2, to the resonance coil Lre. As a result of electrically connecting the second reverse-conducting diode D2, the voltage applied to the second switch S2 is approximately 0 V.

The fourth mode M4 starts as a result of the second switch S2 turning on. If the voltage applied to the second switch S2 is approximately 0 V immediately before switching, ZVS is realized. In the fourth mode M4, the second switch S2 and the third switch S3 are on, while the first switch S1 and the fourth switch S4 are off. At this point, the energy accumulated in the resonance coil Lre causes a current to flow along a path extending from the resonance coil Lre, through the primary winding TF1, the third switch S3, the DC voltage source E, and the second switch S2, to the resonance coil Lre. After the discharge of energy accumulated in the resonance coil Lre finishes, the DC voltage source E causes a current to flow along a extending path from the DC voltage source E, through the third switch S3, the primary winding TF1, the resonance coil Lre, and the second switch S2, to the DC voltage source E, and energy is accumulated in the resonance coil Lre. After that, the fourth mode M4 ends as a result of the second switch S2 turning off.

In the dead time after the fourth mode M4, the energy accumulated in the resonance coil Lre causes a current to flow along a path extending from the resonance coil Lre, through the first capacitor C1, the third switch S3, and the primary winding TF1, to the resonance coil Lre, and the first capacitor C1 is discharged. In addition, the energy accumulated in the resonance coil Lre causes a current to flow along a path extending from the resonance coil Lre, through the second capacitor C2, the DC voltage source E, the third switch S3, and the primary winding TF1, to the resonance coil Lre, and the second capacitor C2 is charged. After the first capacitor C1 finishes discharging and the second capacitor C2 finishes charging, the energy accumulated in the resonance coil Lre causes a current to flow along a path extending from the resonance coil Lre, through the first reverse-conducting diode D1, the third switch S3, and the primary winding TF1, to the resonance coil Lre. As a result of electrically connecting the first reverse-conducting diode D1, the voltage applied to the first switch S1 is approximately 0 V.

<Equalization of Current by First Cycle and Second Cycle>

Changing between the first cycle and the second cycle may be interpreted as the sequential changing from the first mode M1 to the fourth mode M4 in the control signals. In other words, the first cycle includes the first mode M1, the second mode M2, the third mode M3, and the fourth mode M4, in that order. Meanwhile, the second cycle includes the third mode M3, the second mode M2, the first mode M1, and the fourth mode M4, in that order. In other words, between the first cycle and the second cycle, the first mode M1 and the third mode M3 are transposed. Note that the period of the first mode M1 and the period of the third mode M3 may be the same. The period of the second mode M2 and the period of the fourth mode M4 may be the same.

The effects of changing between the first cycle and the second cycle are as follows. In both the first cycle and the second cycle, energy is accumulated in the resonance coil Lre during the second mode M2 and the fourth mode M4. The first cycle and the second cycle differ in the order of switching after energy is accumulated in the resonance coil Lre.

In the first cycle, after energy is accumulated in the resonance coil Lre in the fourth mode M4 of the previous cycle, initially the first switch S1 is turned on, and subsequently the fourth switch S4 is turned on. In this case, if there is insufficient energy accumulated in the resonance coil Lre, for example, the current stress on the fourth switch S4 may become large. Also, in the first cycle, after energy is accumulated in the resonance coil Lre in the second mode M2, initially the second switch S2 is turned on, and subsequently the third switch S3 is turned on. In this case, if there is insufficient energy accumulated in the resonance coil Lre, for example, the current stress on the third switch S3 may become large. For this reason, the current stress imposed on the third switch S3 and the fourth switch S4 may become greater than the first switch S1 and the second switch S2.

On the other hand, in the second cycle, after energy is accumulated in the resonance coil Lre in the fourth mode M4 of the previous cycle, initially the fourth switch S4 is turned on, and subsequently the first switch S1 is turned on. In this case, if there is insufficient energy accumulated in the resonance coil Lre, for example, the current stress on the first switch S1 may become large. Also, in the second cycle, after energy is accumulated in the resonance coil Lre in the second mode M2, initially the third switch S3 is turned on, and subsequently the second switch S2 is turned on. In this case, if there is insufficient energy accumulated in the resonance coil Lre, for example, the current stress on the second switch S2 may become large. For this reason, the current stress imposed on the first switch S1 and the second switch S2 may become greater than the third switch S3 and the fourth switch S4.

In the driving method illustrated as an example in FIG. 2, by combining the first cycle and the second cycle, imbalances in the current stress on each switch can be cancelled out and equalized.

Note that the above describes current stress imbalances in the current stress produced when the energy of a resonance coil is insufficient. However, the driving method of the present disclosure may also be applied to current stress imbalances produced by other factors. For example, the driving method of the present disclosure may also be applied to current stress imbalances produced when the parasitic capacitance and/or the parasitic resistance of each switch are inconsistent, or when the switches are devices of different types, such as a full-bridge circuit with a mixture of IGBTs and MOSFETs, for example.

[Working Example]

Figure 4:
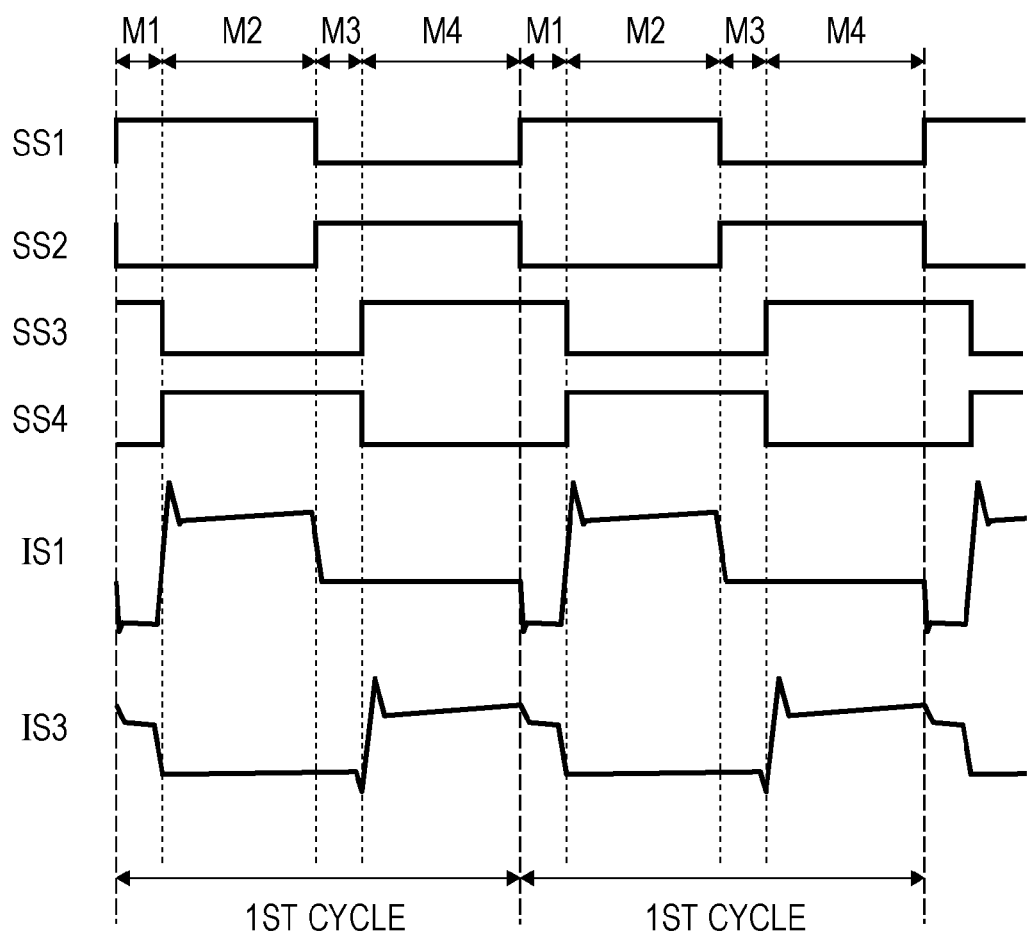
FIG. 4 is a timing chart illustrating operation of a DC-DC converter according to a comparative example.
Figure 5:
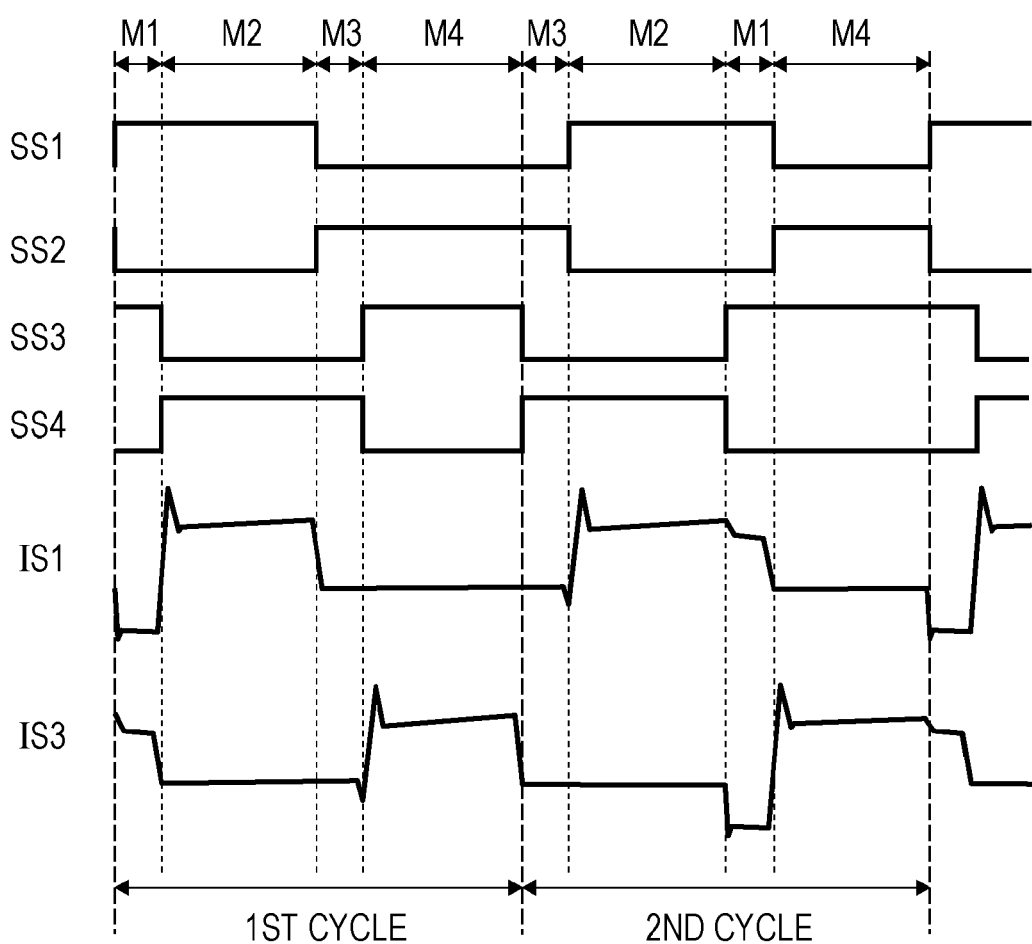
FIG. 5 is a timing chart illustrating operation of a DC-DC converter according to a working example.

FIG. 4 is a diagram that schematically illustrates a timing chart of the control signals SS1 to SS4 in a comparative example made up of only the first cycle, as well as the waveforms of the current 151 flowing through the first switch S1 and the current IS3 flowing through the third switch S3. FIG. 5 is a diagram that schematically illustrates a timing chart of the control signals SS1 to SS4 in a working example made up of the first cycle and the second cycle, as well as the waveforms of the current 151 flowing through the first switch S1 and the current IS3 flowing through the third switch S3.

When the control signal group is made up of only the first cycle, the current IS1 and the current IS3 each exhibit the same waveform per cycle, as illustrated in FIG. 4. In addition, the waveform of the current IS1 and the waveform of the current IS3 differ from each other.

On the other hand, when the control signal group is made up of the first cycle and the second cycle, the current IS1 and the current IS3 exhibit waveforms that differ in both the first cycle and the second cycle, as illustrated in FIG. 5. In addition, the waveform of the current IS1 and the waveform of the current IS3, although respectively different in each cycle, resemble each other in each mode. For example, the current IS1 in the first cycle resembles the current IS3 in the second cycle, while the current IS3 in the first cycle resembles the current IS1 in the second cycle. In this way, by alternately changing between the first cycle and the second cycle, imbalances in the current stress imposed on each switch can be cancelled out, and the current stress can be equalized. In addition, by alternately changing between the first cycle and the second cycle, the configuration of the control signal generator 10 and/or the control signal selector 13 can be simplified.

Figure 6A:
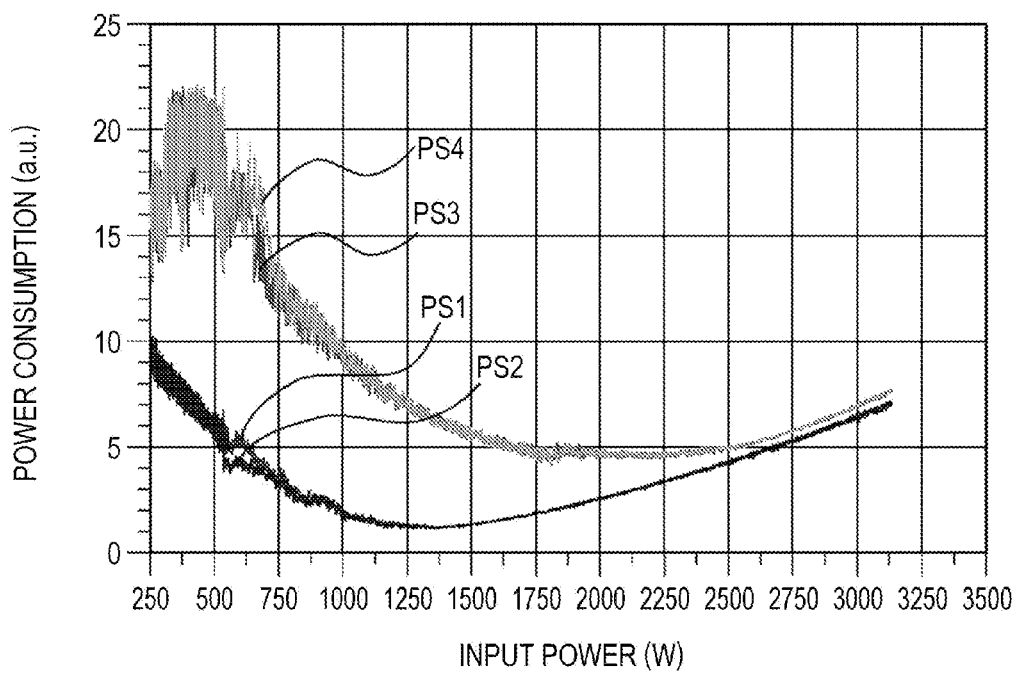
FIGS. 6A and 6B are diagrams illustrating power loss in respective switches in a comparative example and a working example.
Figure 6B:
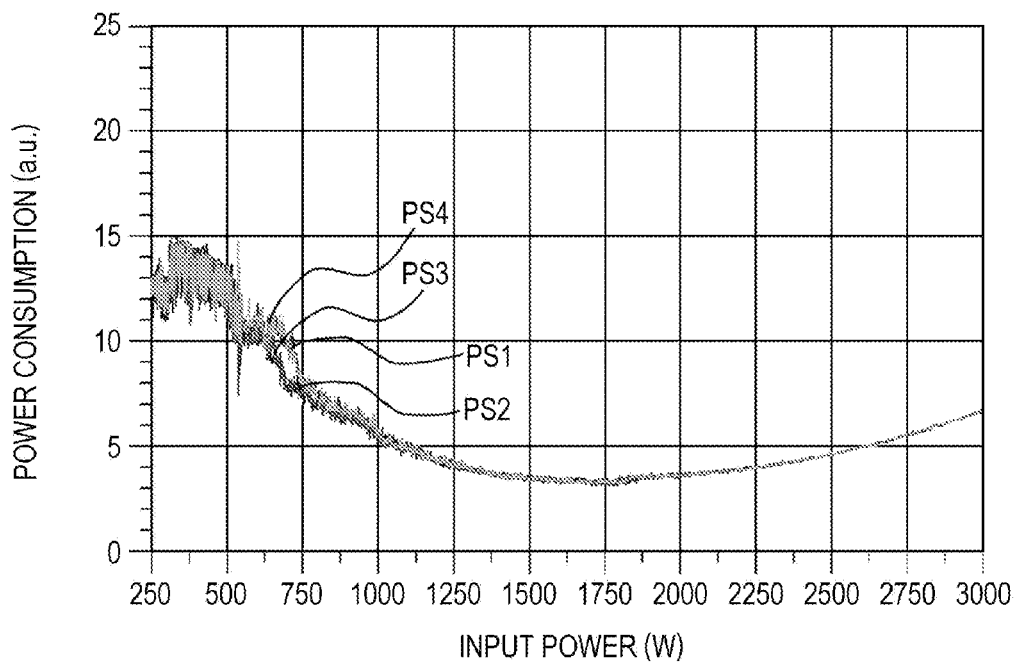

FIGS. 6A and 6B illustrate the effects of equalization on power loss when the control signal group illustrated in FIG. 5 is input into the DC-DC converter 5. FIG. 6A is a graph illustrating a simulation result of the power loss in each switch for the case of driving the full-bridge circuit INV with a control signal group made up of only the first cycle as illustrated in FIG. 4. FIG. 6B is a graph illustrating a simulation result of the power loss in each switch for the case of driving the full-bridge circuit INV with a control signal group made up of the first cycle and the second cycle as illustrated in FIG. 5. In each graph, the vertical axis indicates power consumption, while the horizontal axis indicates the power that is output from the full-bridge circuit INV and input into the primary winding TF1 of the high-frequency transformer TF. In both FIGS. 6A and 6B, the simulation was conducted under the conditions of the driving frequency at 100 kHz and the output voltage from 250 W to 2000 W. In FIGS. 6A and 6B, the power loss of the first switch S1 is labeled PS1, the power loss of the second switch S2 is labeled PS2, the power loss of the third switch S3 is labeled PS3, and the power loss of the fourth switch S4 is labeled PS4.

In FIG. 6A, in the high-power region where the input voltage is 2500 W or greater, the power losses PS1 to PS4 of the switches exhibit approximately the same values. However, in the low-power region where the input voltage is less than 2500 W, the power loss PS3 of the third switch S3 and the power loss PS4 of the fourth switch S4 are greater than the power loss PS1 of the first switch S1 and the power loss PS2 of the second switch S2. This means that the current stress on the third switch S3 and the fourth switch S4 is greater than the current stress on the first switch S1 and the second switch S2.

On the other hand, in FIG. 6B, the power losses PS1 to PS4 of the switches exhibit approximately the same values over the region from low-power to high-power. This means that with the control method of the present disclosure, the current stress imposed on each of the switches S1 to S4 is equalized.

[Control Signal Modification 1]

Figure 7:
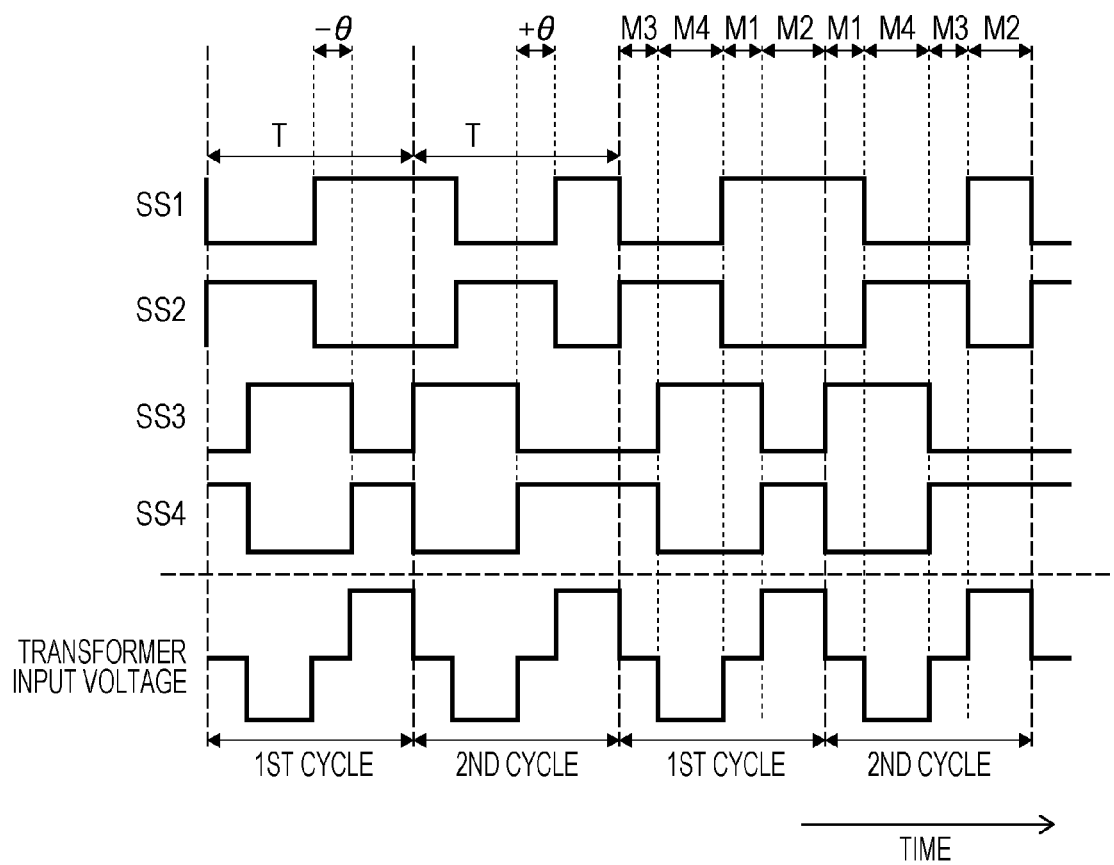
FIG. 7 is a timing chart illustrating Modification 1 of the operation of a DC-DC converter.

FIG. 7 is a timing chart illustrating Modification 1 of the operation of the DC-DC converter 5 in FIG. 1.

The control signal group illustrated in the upper part of FIG. 7 corresponds to the result of transposing the control signal SS1 and the control signal SS2, and transposing the control signal SS3 and the control signal SS4, in the control signal group illustrated in FIG. 2.

The lower part of FIG. 7 illustrates the voltage that is output from the full-bridge circuit INV and input into the primary winding TF1 of the high-frequency transformer TF. The waveform of the voltage generated by the full-bridge circuit INV illustrated in FIG. 7 is the inverse of the waveform of the voltage illustrated in FIG. 2.

The definitions of the first mode M1, the second mode M2, the third mode M3, and the fourth mode M4 are similar to the earlier discussion. In Modification 1, the first cycle includes the third mode M3, the fourth mode M4, the first mode M1, and the second mode M2, in that order. Meanwhile, the second cycle includes the first mode M1, the fourth mode M4, the third mode M3, and the second mode M2, in that order. In other words, between the first cycle and the second cycle, the first mode M1 and the third mode M3 are transposed. In Modification 1, the first phase difference (−θ) corresponds to the period of mode M1 in the first cycle, while the second phase difference (+θ) corresponds to the period of mode M3 in the second cycle. Note that a dead time may additionally be provided in the control signal group illustrated in FIG. 7.

Modification 1 likewise exhibits advantageous effects similar to the example illustrated in FIG. 2. In other words, between the first cycle and the second cycle, the switches are turned on in a different order after energy is accumulated in the resonance coil Lre. For this reason, by combining the first cycle and the second cycle, imbalances in the current stress on each switch are cancelled out and equalized.

[Control Signal Modification 2]

Figure 8:
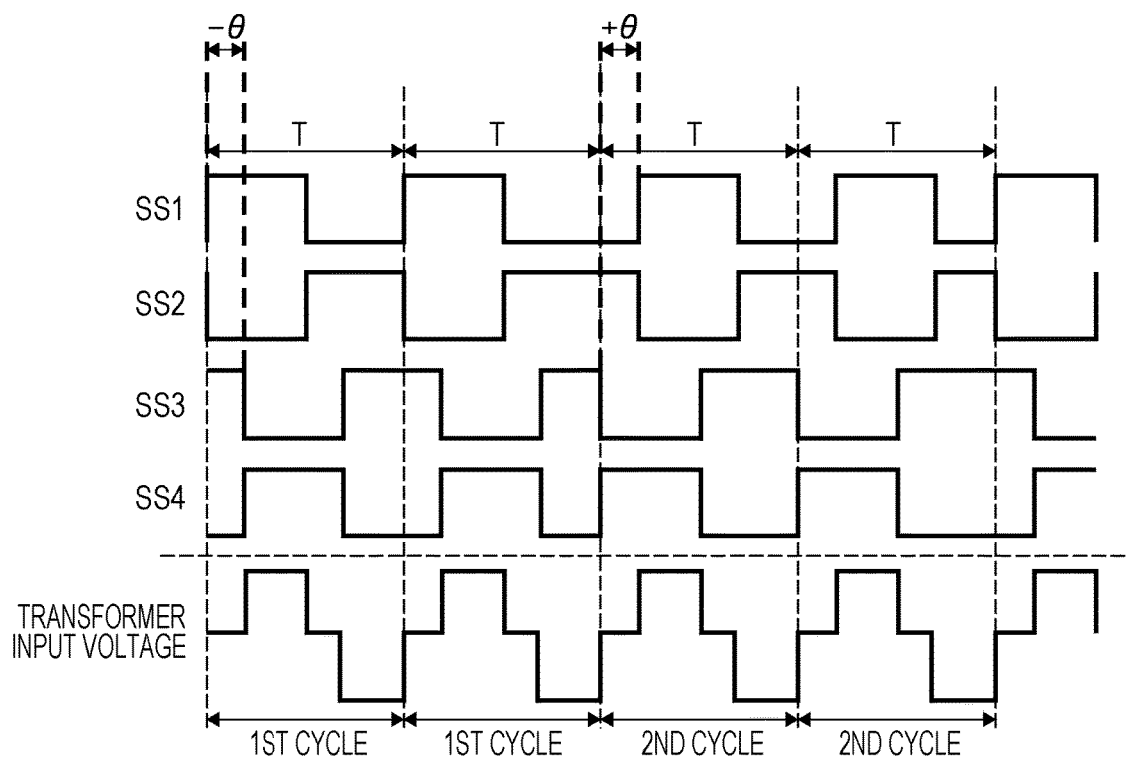
FIG. 8 is a timing chart illustrating Modification 2 of the operation of a DC-DC converter.

FIG. 8 is a timing chart illustrating Modification 2 of the operation of the DC-DC converter 5 in FIG. 1.

In Modification 2, the control signal group is configured so that after the first cycle is repeated N times (where N is an integer of 1 or more), the second cycle is repeated M times (where M is an integer of 1 or more). For such a control signal group, the control signal selector 13 specifies repeat counts to the control signal generator 10, and on the basis thereof, the control signal generator 10 generates the control signal SS1 to the control signal SS4. Note that the variable N and the variable M may be the same value, or different values. Additionally, the variable N and the variable M may be fixed values, or varying values. In addition, the case of a repeat count of 1 for N and M is the same as the example illustrated in FIG. 2. Note that a dead time may additionally be provided in the control signal group illustrated in FIG. 8.

FIG. 8 illustrates an example in which the first cycle is repeated two times, and then the second cycle is repeated two times. The frequency of changing may be lowered further. In other words, N and M may also be 3 or more. For example, the first cycle and the second cycle may be changed over a shorter period than a period over which the temperature of each switch rises and the temperatures of the switches become inconsistent. The period over which the temperatures of the switches become inconsistent may be determined on the basis of experimental testing or simulation, for example.

The operation of the first cycle and the operation of the second cycle is similar to the earlier discussion. However, when the first cycle is conducted again after the first cycle, the fourth mode M4 in the previous first cycle ends as a result of the second switch S2 turning off. If a dead time exists between the fourth mode M4 of the previous first cycle and the first mode M1 of the next first cycle, the circuit behavior during the dead time is similar to the dead time after the fourth mode M4 in the second cycle discussed earlier, for example. In addition, when the second cycle is conducted again after the second cycle, the fourth mode M4 in the previous second cycle ends as a result of the third switch S3 turning off. If a dead time exists between the fourth mode M4 of the previous second cycle and the third mode M3 of the next second cycle, the circuit behavior during the dead time is similar to the dead time after the fourth mode M4 in the second cycle discussed earlier, for example.

Modification 2 likewise exhibits advantageous effects similar to the example illustrated in FIG. 2. In other words, between the first cycle and the second cycle, the switches are turned on in a different order after energy is accumulated in the resonance coil Lre. For this reason, by combining the first cycle and the second cycle, imbalances in the current stress on each switch are cancelled out and equalized.

[Control Signal Modification 3]

Figure 9:
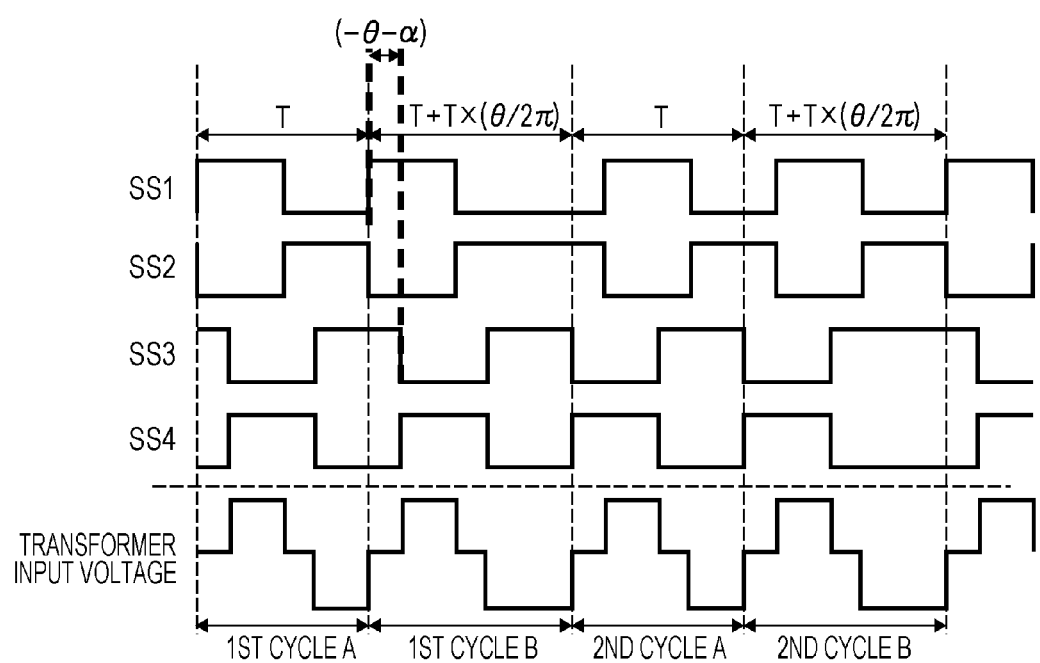
FIG. 9 is a timing chart illustrating Modification 3 of the operation of a DC-DC converter.

FIG. 9 is a timing chart illustrating Modification 3 of the operation of the DC-DC converter 5 in FIG. 1.

In Modification 3, the control signal group includes at least one of a plurality of first cycles having the same sequence of turning each switch on and off, but different cycle lengths, and a plurality of second cycles having the same sequence of turning each switch on and off, but different cycle lengths. However, the control signal group includes at least one first cycle and at least one second cycle. For example, the control signal group includes a cycle having a third phase difference that differs from the first phase difference (−θ) and the second phase difference (+θ).

The control signal group illustrated in FIG. 9 includes a first cycle A having the first phase difference (−θ) and a first cycle length T, a first cycle B having a third phase difference (−θ−α) and a third cycle length T+T×(θ/2π), a second cycle A having the second phase difference (+θ) and a second cycle length T, and a second cycle B having a fourth phase difference (+θ+α) and a fourth cycle length T+T×(θ/2π).

Note that the third cycle length and the third phase difference, as well as the fourth cycle length and the fourth phase difference, may not be intentionally created. As an example, the third cycle length and the third phase difference may be a deformation of the first cycle length and the first phase difference due to the effects of noise or the like, for example. As an example, the fourth cycle length and the fourth phase difference may be a deformation of the second cycle length and the second phase difference due to the effects of noise or the like, for example. In the example illustrated in FIG. 7, the third cycle length is a deformation of the first cycle length, while the fourth cycle length is a deformation of the second cycle length. Such deformation of the cycle length and the phase difference readily occurs when changing between the first cycle and the second cycle. If the cycle length or the phase difference is misaligned, strictly speaking, the voltage applied to the high-frequency transformer TF changes, but if infrequent, the effects are slight.

As described above, the control method of Embodiment 1 is provided with the following configuration. The first cycle changes to a state in which the first switch is on and the second switch is off before changing to a state in which the third switch is off and the fourth switch is on. The second cycle changes to a state in which the first switch is on and the second switch is off after changing to a state in which the third switch is off and the fourth switch is on. The first cycle changes to a state in which the first switch is off and the second switch is on before changing to a state in which the third switch is on and the fourth switch is off. The second cycle changes to a state in which the first switch is off and the second switch is on after changing to a state in which the third switch is on and the fourth switch is off.

In the present disclosure, during the "changing to a state in which the first switch is on and the second switch is off", the time of changing to a state in which the first switch is on may not coincide with the time of changing to a state in which the second switch is off. For example, a dead time may be provided between the time of changing to a state in which the second switch is off and the time of changing to a state in which the first switch is on. Specifically, the signal that causes the change to a state in which the first switch is on and the second switch is off includes a signal that causes a change from state in which the first switch is off and the second switch is on, through an intermediate state in which the first switch is off and the second switch is off, to a state in which the first switch is on and the second switch is off. In this case, the signal that causes the change to a state in which the first switch is on and the second switch is off substantially corresponds to a signal that changes the first switch from off to on. The above is also similar for the case of changing to a state in which the first switch is off and the second switch is on, the case of changing to a state in which the third switch is on and the fourth switch is off, and the case of changing to a state in which the third switch is off and the fourth switch is on.

According to the control method of Embodiment 1, by mixing the first cycle and the second cycle, current stress among the first switch S1 to the fourth switch S4 can be equalized. If the current stress is equalized, the amount of heat generated among the first switch S1 to the fourth switch S4 can be equalized. Consequently, the specifications of cooling mechanisms such as heat sinks may be configured uniformly without over-provisioning or under-provisioning, and thus enlargement of the overall cooling mechanism can be minimized. Additionally, if the current stress can be equalized, the reliability and lifespan of the first switch S1 to the fourth switch S4 can be also homogenized.

Embodiment 2

Figure 10:
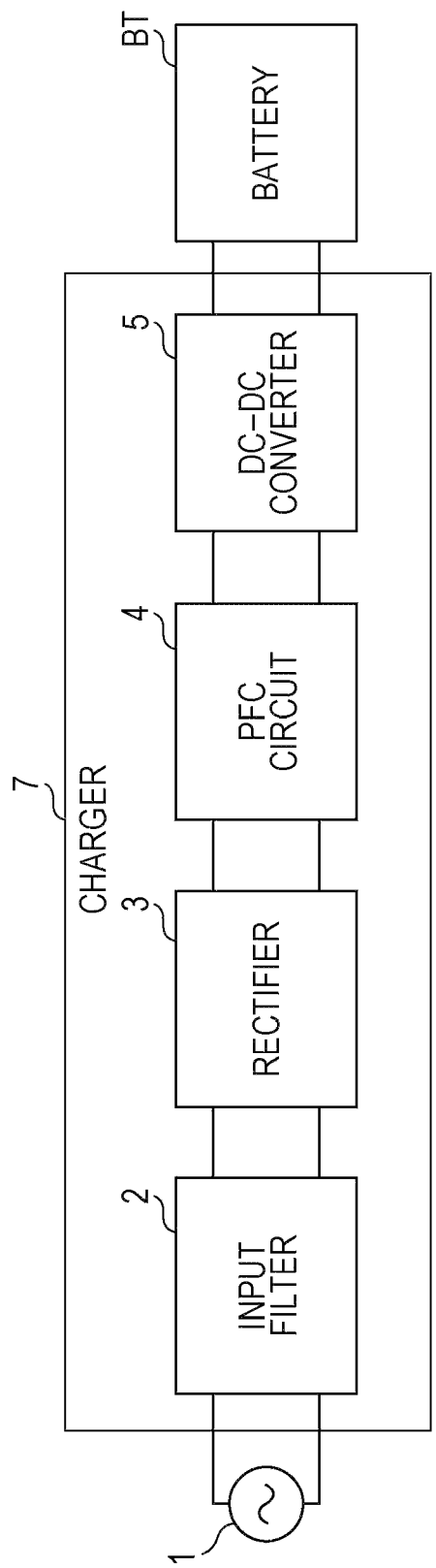
FIG. 10 is a block diagram illustrating an exemplary configuration of a battery charger according to Embodiment 2.

FIG. 10 is a block diagram illustrating an exemplary configuration of a battery charger 7 according to Embodiment 2. The battery charger 7 includes an input filter 2, a rectifier 3, a power factor correction (PFC) circuit 4, and a DC-DC converter 5.

The input filter 2 is a band-pass filter that passes only a predetermined electric utility frequency component out of the AC voltage from an electric utility 1. The input filter 2 outputs the passed AC voltage to the rectifier 3. The rectifier 3 rectifies the AC voltage input from the input filter 2 into a pulsating voltage, and outputs to the PFC circuit 4. The rectifier 3 includes a diode bridge circuit in which four rectifier diodes are connected in a bridge configuration, for example. The PFC circuit 4 corrects the power factor of the power output from the rectifier 3, and outputs to the DC-DC converter 5. The DC-DC converter 5 is a DC-DC converter 5 according to Embodiment 1. The DC-DC converter 5 converts DC voltage input from the PFC circuit 4 into a predetermined DC voltage, and outputs to a battery BT. The battery BT is charged by the DC voltage input from the DC-DC converter 5. The DC-DC converter 5 monitors the output voltage and the output current to the battery BT, for example, and executes constant current charging (CC charging) or constant voltage charging (CV charging). Note that in the case of charging the battery BT from a DC power source, the battery charger 7 may also not be provided with the input filter 2, the rectifier 3, and the PFC circuit 4.

Since the battery charger 7 according to Embodiment 2 includes a phase-shifted DC-DC converter 5 according to Embodiment 1, high-efficiency charging with reduced switching loss can be conducted. Also, since the current stress among the first switch S1 to the fourth switch S4 of the full-bridge circuit INV is equalized, inconsistencies in heat generation and reliability caused by current stress imbalances can be reduced.

Embodiment 3

Figure 11:
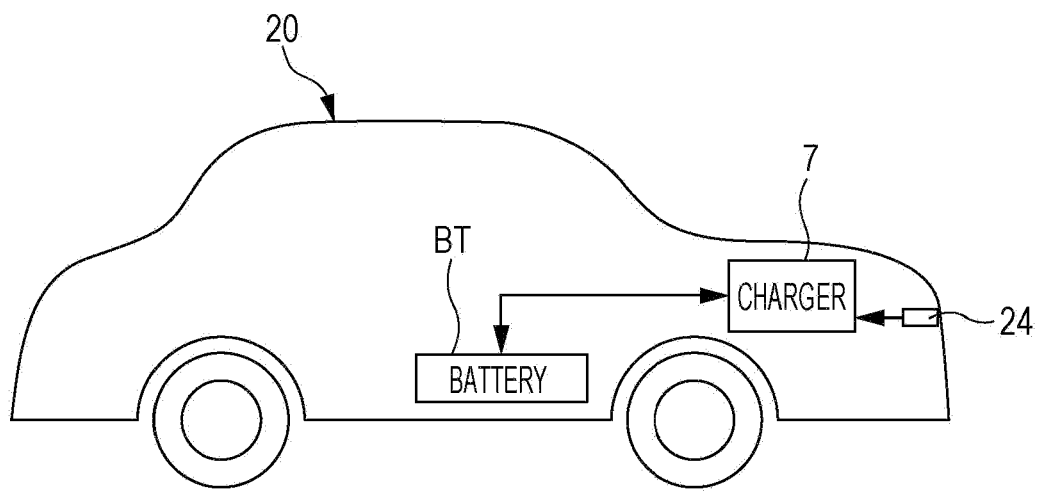
FIG. 11 is a block diagram illustrating an exemplary configuration of a vehicle according to Embodiment 3.

FIG. 11 is a block diagram illustrating an exemplary configuration of a vehicle 20 according to Embodiment 3. The vehicle 20 is an electric vehicle or a plug-in hybrid vehicle, for example. The vehicle 20 includes a power connector 24 for connecting to an external electric utility, and the battery charger 7 and battery BT according to Embodiment 2. Power supplied from the power connector 24 is stored in the battery BT via the battery charger 7.

Since the vehicle 20 according to Embodiment 3 includes the battery charger 7 according to Embodiment 2, high-efficiency charging may be conducted. Also, inconsistencies in heat generation and reliability caused by current stress imbalances among the first switch S1 to the fourth switch S4 may be reduced. The vehicle 20 according to Embodiment 3 may reduce running costs and realize high reliability.

In addition, the vehicle 20 is not limited to being a plug-in hybrid vehicle. The vehicle 20 may also by a hybrid vehicle that does not include the power connector 24 and is unable to perform AC charging from an external source. In this case, an alternator or a motor generator (not illustrated) inside the vehicle 20 generates power, and outputs to the battery charger 7. The generated power is input into the battery charger 7 after being converted to DC power by an inverter (not illustrated), for example. In this case, the vehicle 20 may also not be provided with the input filter 2, the rectifier 3, and the PFC circuit 4 inside the battery charger 7.

Other Embodiments

The foregoing thus describes exemplary embodiments of the present disclosure. Note that the present disclosure also encompasses modifications obtained by combinations of the structural elements and processes discussed above.

For example, after a first cycle having the sequence illustrated in FIG. 7 is repeated N times (where N is an integer of 1 or more), a second cycle having the sequence illustrated in FIG. 7 may be repeated M times (where M is an integer of 1 or more).

For example, in the DC-DC converter 5 of FIG. 4, the resonance coil Lre may also be the leakage inductance of the high-frequency transformer TF. The resonance coil Lre may also be connected in series to the secondary winding TF2 of the high-frequency transformer TF. Also, the first capacitor C1 to the fourth capacitor C4 may also be a parasitic capacitance of the first switch S1 to the fourth switch S4, respectively. Also, the first reverse-conducting diode D1 to the fourth reverse-conducting diode D4 may also be a parasitic diode of the first switch S1 to the fourth switch S4, respectively. Also, the rectifier RE may also be a configuration in which four diodes are connected in a full-bridge.

For example, the DC-DC converter 5 and/or the control method according to Embodiment 1 may be applied to an isolated DC-DC converter of a power conditioner.

The present disclosure is usable in a vehicular onboard battery charger, power conditioner, and the like, for example.

While the present disclosure has been described with respect to exemplary embodiments thereof, it will be apparent to those skilled in the art that the disclosure may be modified in numerous ways and may assume many embodiments other than those specifically described above. Accordingly, it is intended by the appended claims to cover all modifications of the disclosure that fall within the true spirit and scope of the disclosure.

What is claimed is:

1. A switching circuit comprising:
   a full-bridge circuit that includes a first leg, in which a first switch and a second switch are connected in series, and a second leg, in which a third switch and a fourth switch are connected in series, the first leg and the second leg being connected in parallel; and
   a control circuit that outputs a first control signal group and a second control signal group at different timings,
   wherein the full-bridge circuit operates in a plurality of periods that include:
      a first period in which the first switch and the third switch are on while the second switch and the fourth switch are off,
      a second period in which the first switch and the fourth switch are on while the second switch and the third switch are off,
      a third period in which the second switch and the fourth switch are on while the first switch and the third switch are off, and
      a fourth period in which the second switch and the third switch are on while the first switch and the fourth switch are off,
   the first control signal group turns the first switch, the second switch, the third switch, and the fourth switch on and off on a first cycle that transitions, in a continuous manner, in an order of the first period, the second period, the third period, and the fourth period, and
   the second control signal group turns the first switch, the second switch, the third switch, and the fourth switch on and off on a second cycle that transitions, in a continuous manner, in an order of the third period, the second period, the first period, and the fourth period.

2. A switching circuit comprising:
   a full-bridge circuit that includes a first leg, in which a first switch and a second switch are connected in series, and a second leg, in which a third switch and a fourth switch are connected in series, the first leg and the second leg being connected in parallel; and
   a control circuit that outputs a first control signal group and a second control signal group at different timings,
   wherein
   the full-bridge circuit operates in periods that include:
      a first period in which the first switch and the third switch are on while the second switch and the fourth switch are off,
      a second period in which the first switch and the fourth switch are on while the second switch and the third switch are off,
      a third period in which the second switch and the fourth switch are on while the first switch and the third switch are off, and
      a fourth period in which the second switch and the third switch are on while the first switch and the fourth switch are off,
   the first control signal group turns the first switch, the second switch, the third switch, and the fourth switch on and off on a first cycle that transitions, in a continuous manner, in an order of the third period, the fourth period, the first period, and the second period, and
   the second control signal group turns the first switch, the second switch, the third switch, and the fourth switch on and off on a second cycle that transitions, in a continuous manner, in an order of the first period, the fourth period, the third period, and the second period.

3. The switching circuit according to claim 1, wherein the control circuit is operative to cause the second cycle to repeat M times, after causing the first cycle to repeat N times, where N and M are each an integer of 1 or more.

4. The switching circuit according to claim 2, wherein the control circuit is operative to cause the second cycle to repeat M times, after causing the first cycle to repeat N times, where N and M are each an integer of 1 or more.

5. The switching circuit according to claim 1, wherein the control circuit is operative to cause the first cycle and the second cycle to repeat alternately.

6. The switching circuit according to claim 2, wherein the control circuit is operative to cause the first cycle and the second cycle to repeat alternately.

7. The switching circuit according to claim 1, wherein a conducting terminal of the first switch is connected to a conducting terminal of the third switch, and a conducting terminal of the second switch is connected to a conducting terminal of the fourth switch.

8. The switching circuit according to claim 7, wherein the switching circuit is connected to a resonance coil, and the resonance coil is connected between a connection point between the first switch and the second switch, and a connection point between the third switch and the fourth switch.

9. The switching circuit according to claim 8, wherein the full-bridge circuit includes
   a first capacitor connected in parallel with the first switch,
   a second capacitor connected in parallel with the second switch,
   a third capacitor connected in parallel with the third switch, and
   a fourth capacitor connected in parallel with the fourth switch.

10. The switching circuit according to claim 9,
wherein the control circuit is further operative to
cause one of the first capacitor and the second capacitor to be charged while causing the other to be discharged, according to energy accumulated in the resonance coil, during a first dead time where the first switch and the second switch are off, and
cause one of the third capacitor and the fourth capacitor to be charged while causing the other to be discharged, according to energy accumulated in the resonance coil, during a second dead time where the third switch and the fourth switch are off.

11. The switching circuit according to claim 1, wherein the control circuit includes:
a control signal selector operative to decide which of the first control signal group and the second control signal group is to be output,
a phase controller operative to decide, according to an output information signal, a magnitude of an advanced phase or a magnitude of a retarded phase of a time to turn the first switch on with respect to a time to turn the fourth switch on, and
a control signal generator operative to generate the first control signal group or the second control signal group according to a decision by the control signal selector and a decision by the phase controller.

12. The switching circuit according to claim 11, wherein the control signal selector is operative to decide which of the first control signal group and the second control signal group is to be output without referencing the output information signal.

13. A power converter comprising:
the switching circuit according to claim 1;
a first rectifier operative to rectify an AC voltage output from the switching circuit; and
a smoothing circuit operative to smooth an output voltage of the first rectifier.

14. The switching circuit according to claim 2, wherein:
a conducting terminal of the first switch is connected to a conducting terminal of the third switch, and
a conducting terminal of the second switch is connected to a conducting terminal of the fourth switch.

15. The switching circuit according to claim 14, wherein:
the switching circuit is connected to a resonance coil, and
the resonance coil is connected between a connection point between the first switch and the second switch, and a connection point between the third switch and the fourth switch.

16. The switching circuit according to claim 15,
wherein the full-bridge circuit includes:
a first capacitor connected in parallel with the first switch;
a second capacitor connected in parallel with the second switch;
a third capacitor connected in parallel with the third switch; and
a fourth capacitor connected in parallel with the fourth switch.

17. The switching circuit according to claim 16,
wherein the control circuit is further operative to
cause one of the first capacitor and the second capacitor to be charged while causing the other to be discharged, according to energy accumulated in the resonance coil, during a first dead time where the first switch and the second switch are off, and
cause one of the third capacitor and the fourth capacitor to be charged while causing the other to be discharged, according to energy accumulated in the resonance coil, during a second dead time where the third switch and the fourth switch are off.

18. The switching circuit according to claim 2,
wherein the control circuit includes:
a control signal selector operative to decide which of the first control signal group and the second control signal group is to be output;
a phase controller operative to decide, according to an output information signal, a magnitude of an advanced phase or a magnitude of a retarded phase of a time to turn the first switch on with respect to a time to turn the fourth switch on; and
a control signal generator operative to generate the first control signal group or the second control signal group according to a decision by the control signal selector and a decision by the phase controller.

19. The switching circuit according to claim 18, wherein the control signal selector is operative to decide which of the first control signal group and the second control signal group is to be output without referencing the output information signal.

20. A power converter comprising:
the switching circuit according to claim 2;
a first rectifier operative to rectify an AC voltage output from the switching circuit; and
a smoothing circuit operative to smooth an output voltage of the first rectifier.

* * * * *